(12) United States Patent
Carter et al.

(10) Patent No.: US 10,831,932 B2
(45) Date of Patent: Nov. 10, 2020

(54) COMPUTING SYSTEM WITH A PRESENTATION MECHANISM AND METHOD OF OPERATION THEREOF

(71) Applicant: Telenav, Inc., Santa Clara, CA (US)

(72) Inventors: Casey Carter, Sunnyvale, CA (US); Shalu Grover, Sunnyvale, CA (US); Gregory Stewart Aist, Santa Clara, CA (US)

(73) Assignee: Telenav, Inc., Santa Clara, CA (US)

( * ) Notice: Subject to any disclaimer, the term of this patent is extended or adjusted under 35 U.S.C. 154(b) by 102 days.

(21) Appl. No.: 15/421,343

(22) Filed: Jan. 31, 2017

(65) Prior Publication Data

US 2018/0217802 A1 Aug. 2, 2018

(51) Int. Cl.
*G06F 21/62* (2013.01)
*G01C 21/34* (2006.01)

(52) U.S. Cl.
CPC ........... *G06F 21/629* (2013.01); *G01C 21/34* (2013.01); *G06F 2221/2111* (2013.01)

(58) Field of Classification Search
CPC ................. G06F 3/1454; G06F 21/629; G06F 2221/2111; G01C 21/34
See application file for complete search history.

(56) References Cited

U.S. PATENT DOCUMENTS

| | | | |
|---|---|---|---|
| 6,202,008 B1 | 3/2001 | Beckert et al. | |
| 8,326,282 B2 | 12/2012 | Margis | |
| 9,269,265 B2 | 2/2016 | Ayoub et al. | |
| 2007/0124046 A1* | 5/2007 | Ayoub | G08G 1/096811 |
| | | | 701/36 |
| 2009/0081947 A1 | 3/2009 | Margis | |
| 2011/0130852 A1* | 6/2011 | Thorn | G06F 16/4387 |
| | | | 700/94 |
| 2011/0258706 A1* | 10/2011 | Rouse | G06F 21/10 |
| | | | 726/28 |
| 2015/0276415 A1* | 10/2015 | Shrinath | G01C 21/34 |
| | | | 701/1 |
| 2017/0127123 A1* | 5/2017 | Lidow | H04N 21/4331 |
| 2018/0092057 A1* | 3/2018 | Yamashita | H04W 4/12 |
| 2020/0106726 A1* | 4/2020 | Pham | H04L 51/08 |

\* cited by examiner

*Primary Examiner* — Sherrod L Keaton
(74) *Attorney, Agent, or Firm* — Perspectives Law Group, Corp.

(57) ABSTRACT

A computing system comprising: a first control unit or a second control unit configured to: receive a request to send or to receive a content; determine whether to send or to receive the content based on a threshold; monitor an environmental characteristic; control a presentation of the content based on the environmental characteristic; a first communication unit or a second communication unit, coupled to the first control unit or the second control unit, configured to send or to receive a first device transmission or a second device transmission of the content based on the threshold; and a first user interface or a second user interface, coupled to the first control unit or the second control unit, configured to present the content.

17 Claims, 5 Drawing Sheets

COMPUTING SYSTEM WITH A PRESENTATION MECHANISM AND METHOD OF OPERATION THEREOF

TECHNICAL FIELD

An embodiment of the present invention relates generally to a computing system, and more particularly to a computing system with a presentation mechanism.

BACKGROUND

Modern consumer and industrial electronics, especially devices such as cellular phones, smart phones, tablet computers, vehicle integrated computing and communication systems, portable digital assistants, and combination devices, are providing increasing levels of functionality to support modern life including communication services. Research and development in the existing technologies can take a myriad of different directions.

Individuals are spending more of their lives commuting to and from locations. Past reasons to spend a significant amount of time commuting still apply, such as going on cross-country road trips. However, certain social trends have made long-distance commutes a part of daily life for many individuals. For example, in certain metropolitan areas, living near a person's workplace has become increasingly infeasible because housing prices and wages have not kept pace with one another. Thus, individuals are economically excluded from living near their places of work and have been forced to move further away from their places of work. The result is increased commute times, oftentimes resulting in commute times of several hours per day.

Longer commutes have resulted in a greater amount of unproductive or idle time while individuals are in transit. Thus, a need still remains to capture some of the unproductive or idle time. One method is to allow individuals to access and consume content while in transit. However, a need remains for a computing system with a mechanism that allows presentation of content while allowing control over content.

Solutions to these problems have been long sought but prior developments have not taught or suggested any solutions and, thus, solutions to these problems have long eluded those skilled in the art.

SUMMARY

An embodiment of the present invention provides a computing system, comprising: a control unit configured to: receive a request to send or to receive a content; determine whether to send or to receive the content based on a threshold; monitor an environmental characteristic; control a presentation of the content based on the environmental characteristic; a communication unit, coupled to the control unit, configured to send or to receive a transmission of the content based on the threshold; and a user interface, coupled to the control unit, configured to present the content.

An embodiment of the present invention provides a method of operating a computing system comprising: receiving a request to send or to receive a content; determining whether to send or to receive the content based on a threshold; performing a transmission of the content based on the threshold for presenting the content; monitoring an environmental characteristic; and controlling a presentation of the content based on the environmental characteristic.

An embodiment of the present invention provides a non-transitory computer readable medium including instructions for operating a computing system comprising: receiving a request to send or to receive a content; determining whether to send or to receive the content based on a threshold; performing a transmission of the content based on the threshold for presenting the content; monitoring an environmental characteristic; and controlling a presentation of the content based on the environmental characteristic.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "vehicle" referred to herein can include cars, self-driving cars, trains, buses, bicycles, boats, motorcycles, airplanes, helicopters, or any other mode of transport, or a combination thereof in an embodiment of the present invention in accordance with the context in which the term is used.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the system claims section below, the modules are deemed to include hardware circuitry for the purposes and the scope of system claims.

The modules in the following description of the embodiments can be coupled to one other as described or as shown. The coupling can be direct or indirect without or with, respectively, intervening items between coupled items. The coupling can be physical contact or by communication between items.

Figure 1:
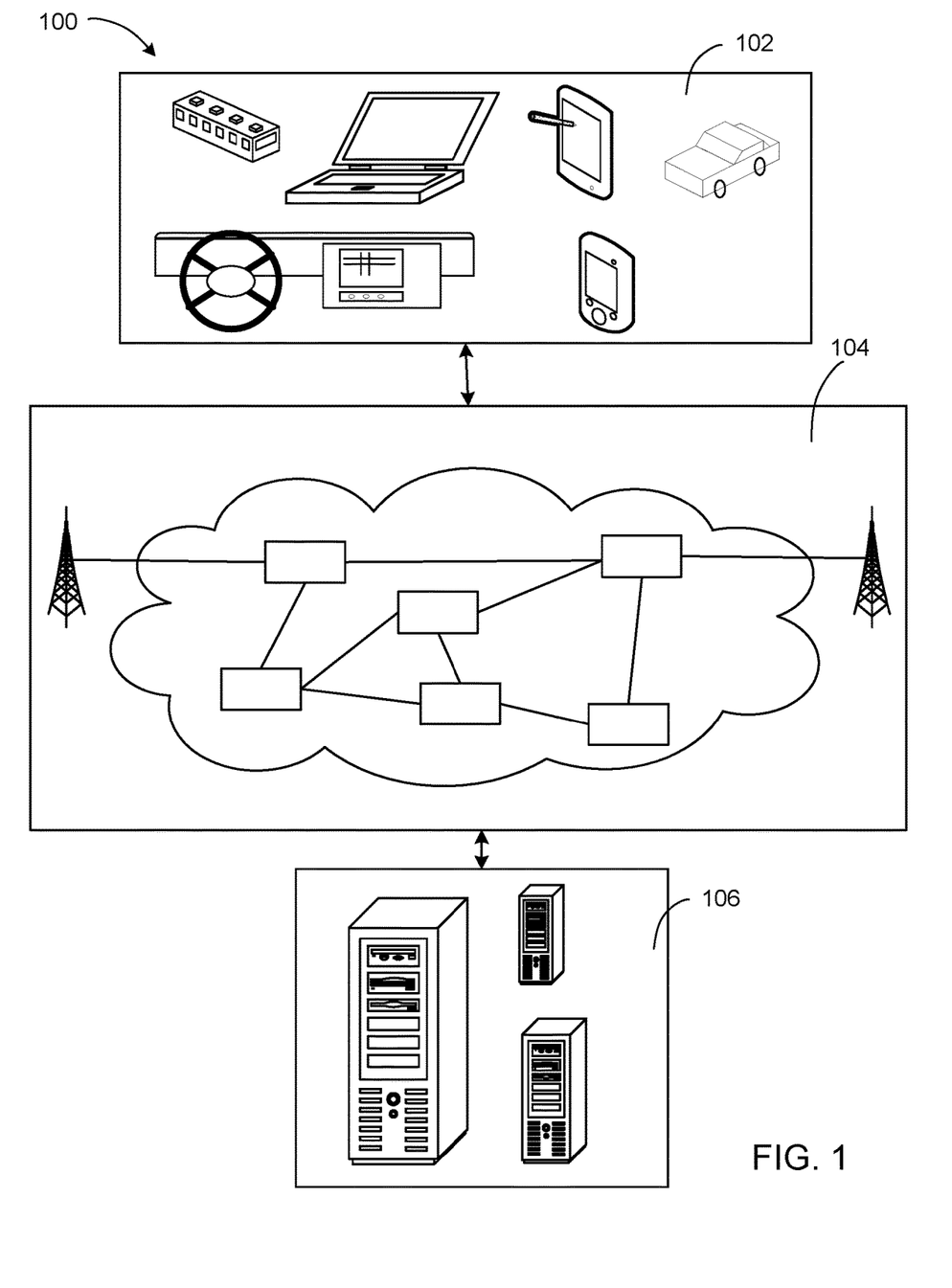
FIG. 1 is a computing system with a presentation mechanism in an embodiment of the present invention.

Referring now to FIG. 1, therein is shown a computing system 100 with a presentation mechanism in a first embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a smart phone, cellular phone, personal digital assistant, tablet computer, a notebook computer, laptop computer, desktop computer, or a vehicle integrated communication system. The first device 102 can couple, either directly or indirectly, to the communication path 104 to communicate with the second device 106 or can be a stand-alone device. The first device 102 can be incorporated in a vehicle.

The second device 106 can be any of a variety of centralized or decentralized computing devices. For example, the second device 106 can be a laptop computer, a desktop computer, a video game console, grid-computing resources, a virtualized computer resource, cloud computing resource, routers, switches, peer-to-peer distributed computing devices, server, or a combination thereof. The second device 106 can be centralized in a single room, distributed across different rooms, distributed across different geographical locations, embedded within a telecommunications network. The second device 106 can couple with the communication path 104 to communicate with the first device 102. The second device 106 can be incorporated in a vehicle.

For illustrative purposes, the computing system 100 is shown with the first device 102 as a client device, although it is understood that the computing system 100 can have the first device 102 as a different type of device. For example, the first device 102 can be a server. Also for illustrative purposes, the computing system 100 is shown with the second device 106 as a server, although it is understood that the computing system 100 can have the second device 106 as a different type of device. For example, the second device 106 can be a client device.

For brevity of description in the embodiments discussed below, the first device 102 will be described as a client device and the second device 106 will be described as a server device. The embodiments of the present invention, however, are not limited to this selection for the type of devices. The selection is an example of an embodiment of the present invention.

Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
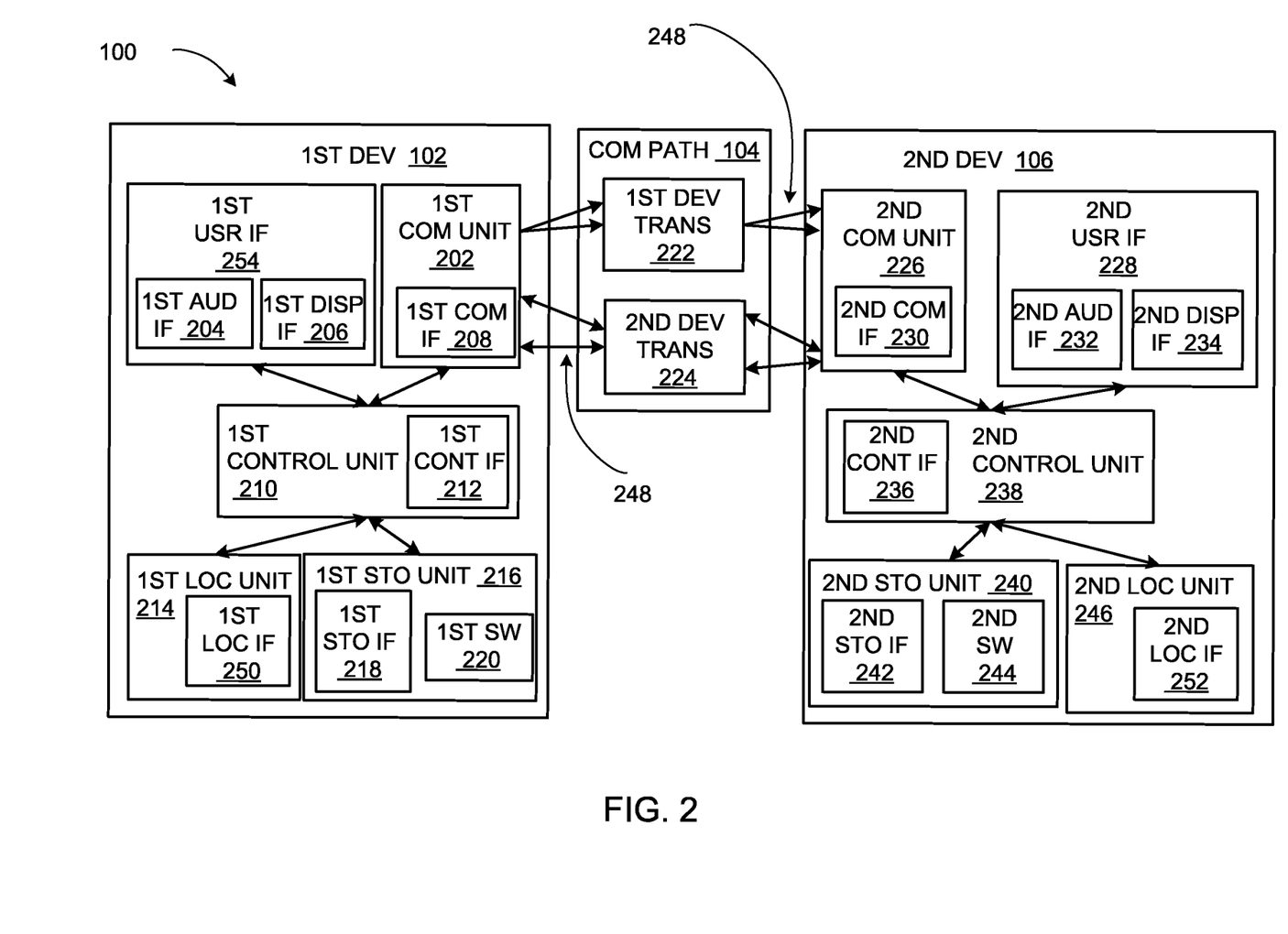
FIG. 2 is an exemplary block diagram of the components of the computing system.

Referring now to FIG. 2, therein is shown an exemplary block diagram of the components of the computing system 100. The first device 102 can send information in a first device transmission 222 over the communication path 104 to the second device 106. The second device 106 can send information in a second device transmission 224 over the communication path 104 to the first device 102. The first device transmission 222 and the second device transmission 224 can be sent over one or more communication channels 248. A communication channel 248 refers either to a physical transmission medium such as a wire, or to a logical connection over a multiplexed medium such as a radio channel.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the entertainment system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 210, a first storage unit 216, a first communication unit 202, a first user interface 254, and a first location unit 214. The first control unit 210 can include a first control interface 212. The first control unit 210 can execute a first software 220 to provide the intelligence of the computing system 100. The first control unit 210 can be implemented in a number of different ways. For example, the first control unit 210 can be a processor, an application specific integrated circuit (ASIC) an embedded processor, a microprocessor, a hardware control logic, a hardware finite state machine (FSM), a digital signal processor (DSP), or a combination thereof.

The first control interface 212 can be used for communication between the first control unit 210 and other functional units in the first device 102. The first control interface 212 can also be used for communication that is external to the first device 102. The first control interface 212 can receive information from the other functional units or from external sources, or can transmit information to the other functional units or to external destinations. The external sources and the external destinations refer to sources and destinations external to the first device 102.

The first control interface 212 can be implemented in different ways and can include different implementations depending on which functional units or external units are being interfaced with the first control interface 212. For example, the first control interface 212 can be implemented with a pressure sensor, an inertial sensor, a microelectromechanical system (MEMS), optical circuitry, waveguides, wireless circuitry, wireline circuitry, or a combination thereof.

The first storage unit 216 can store the first software 220. For illustrative purposes, the first storage unit 216 is shown as a single element, although it is understood that the first storage unit 216 can be a distribution of storage elements. Also for illustrative purposes, the computing system 100 is shown with the first storage unit 216 as a single hierarchy storage system, although it is understood that the computing system 100 can have the first storage unit 216 in a different configuration. For example, the first storage unit 216 can be formed with different storage technologies forming a memory hierarchal system including different levels of caching, main memory, rotating media, or off-line storage.

The first storage unit 216 can be a volatile memory, a nonvolatile memory, an internal memory, an external memory, or a combination thereof. For example, the first storage unit 216 can be a nonvolatile storage such as non-volatile random access memory (NVRAM), Flash memory, disk storage, or a volatile storage such as static random access memory (SRAM).

The first storage unit 216 can include a first storage interface 218. The first storage interface 218 can be used for communication between the first storage unit 216 and other functional units in the first device 102. The first storage interface 218 can also be used for communication that is external to the first device 102. The first storage interface 218 can receive information from the other functional units or from external sources, or can transmit information to the other functional units or to external destinations. The external sources and the external destinations refer to sources and destinations external to the first device 102.

The first storage interface 218 can include different implementations depending on which functional units or external units are being interfaced with the first storage unit 216. The first storage interface 218 can be implemented with technologies and techniques similar to the implementation of the first control interface 212.

The first communication unit 202 can enable external communication to and from the first device 102. For example, the first communication unit 202 can permit the first device 102 to communicate with the second device 106 of FIG. 1, an attachment, such as a peripheral device or a computer desktop, and the communication path 104.

The first communication unit 202 can also function as a communication hub allowing the first device 102 to function as part of the communication path 104 and not limited to be an end point or terminal unit to the communication path 104. The first communication unit 202 can include active and passive components, such as microelectronics or an antenna, for interaction with the communication path 104.

The first communication unit 202 can include a first communication interface 208. The first communication interface 208 can be used for communication between the first communication unit 202 and other functional units in the first device 102. The first communication interface 208 can receive information from the other functional units or from external sources, or can transmit information to the other functional units or to external destinations. The external sources and the external destinations refer to sources and destinations external to the first device 102.

The first communication interface 208 can include different implementations depending on which functional units are being interfaced with the first communication unit 202. The first communication interface 208 can be implemented with technologies and techniques similar to the implementation of the first control interface 212.

The first communication unit 202 can couple with the communication path 104 to send information to the second device 106 in the first device transmission 222. The second device 106 can receive information in a second communication unit 226 from the first device transmission 222 of the communication path 104.

The first control unit 210 can operate the first user interface 254 to present information generated by the computing system 100. The first user interface 254, in one embodiment, allows a system user 304 (not shown) to interface with the first device 102. The first user interface 254 can include an input device and an output device. Examples of the input device of the first user interface 254 can include a keypad, a touchpad, soft-keys, a keyboard, a microphone, sensors for receiving remote signals, or any combination thereof to provide data and communication inputs. Examples of the output device can include a first display interface 206 and a first audio interface 204.

The first control unit 210 can operate the first user interface 254 to present information generated by the computing system 100. The first control unit 210 can also execute the first software 220 for the other functions of the computing system 100. The first control unit 210 can further execute the first software 220 for interaction with the communication path 104 via the first communication unit 202.

The first display interface 206 can be any graphical user interface such as a display, a projector, a video screen, or any combination thereof. The first audio interface 204 can include sensors, speakers, microphones, headphones, subwoofers, surround sound components, transducers, or any combination thereof.

The first display interface 206 and the first audio interface 204 allow a system user 304 (not shown) to interact with the computing system 100 in order search for content 310 (not shown). Content 310 is information expressed through a medium such as an audio file, a video file, an image file, a tactile file, or any combination thereof, that is directed to an end-user or audience. Content 310 includes, a movie file, a music file, an image, an electronic book, a news feed, an email, a computer file, or any combination thereof.

Content 310 (not shown) can be sent to the first device 102 from the second device 106, or to the second device 106 from the first device 102, in a content stream. Content stream is the transmission of content 310, through the first device transmission 222, the second device transmission 224, or a combination thereof.

The first location unit 214 can generate location information, current heading, and current speed of the first device 102, as examples. The first location unit 214 can be implemented in many ways. For example, the first location unit 214 can function as at least a part of a global positioning system (GPS) and can include components, such as a GPS receiver; an inertial navigation system, a cellular-tower location system, a pressure location system, or any combination thereof.

The first location unit 214 can include a first location interface 250. The first location interface 250 can be used for communication between the first location unit 214 and other functional units in the first device 102. The first location interface 250 can also be used for communication that is external to the first device 102. The first location interface 250 can be implemented with technologies and techniques similar to the implementation of the first control interface 212.

The second device 106 can be optimized for implementing an embodiment of the present invention in a multiple device embodiment with the first device 102. The second device 106 can provide additional or higher performance processing power compared to the first device 102. The second device 106 can include a second control unit 238, a second storage unit 240, a second communication unit 226, a second user interface 228, and a second location unit 246.

The second control unit 238 can include a second control interface 236. The second control unit 238 can execute a second software 244 to provide the intelligence of the computing system 100. The second software 244 can also operate independently or in conjunction with the first software 220. The second control unit 238 can provide additional performance compared to the first control unit 210.

The second control unit 238 can be implemented in a number of different ways. For example, the second control unit 238 can be a processor, an application specific integrated circuit (ASIC) an embedded processor, a microprocessor, a hardware control logic, a hardware finite state machine (FSM), a digital signal processor (DSP), or a combination thereof.

The second control interface 236 can be used for communication between the second control unit 238 and other functional units in the second device 106. The second control interface 236 can also be used for communication that is external to the second device 106. The second control interface 236 can receive information from the other functional units or from external sources, or can transmit information to the other functional units or to external destinations. The external sources and the external destinations refer to sources and destinations external to the second device 106.

The second control interface 236 can be implemented in different ways and can include different implementations depending on which functional units or external units are being interfaced with the second control interface 236. For example, the second control interface 236 can be implemented with a pressure sensor, an inertial sensor, a microelectromechanical system (MEMS), optical circuitry, waveguides, wireless circuitry, wireline circuitry, or a combination thereof.

The second storage unit 240 can store the second software 244. The second storage unit 240 can be sized to provide the additional storage capacity to supplement the first storage unit 216. For illustrative purposes, the second storage unit 240 is shown as a single element, although it is understood that the second storage unit 240 can be a distribution of storage elements. Also for illustrative purposes, the computing system 100 is shown with the second storage unit 240 as a single hierarchy storage system, although it is understood that the computing system 100 can have the second storage unit 240 in a different configuration. For example, the second storage unit 240 can be formed with different storage technologies forming a memory hierarchal system including different levels of caching, main memory, rotating media, or off-line storage.

The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units in the second device 106. The second storage interface 242 can also be used for communication that is external to the second device 106. The second storage interface 242 can receive information from the other functional units or from external sources, or can transmit information to the other functional units or to external destinations. The external sources and the external destinations refer to sources and destinations external to the second device 106.

The second storage interface 242 can include different implementations depending on which functional units or external units are being interfaced with the second storage unit 240. The second storage interface 242 can be implemented with technologies and techniques similar to the implementation of the second control interface 236.

The second communication unit 226 can enable external communication to and from the second device 106. For example, the second communication unit 226 can permit the second device 106 to communicate with the first device 102 of FIG. 1, an attachment, such as a peripheral device or a computer desktop, and the communication path 104.

The second communication unit 226 can also function as a communication hub allowing the second device 106 to function as part of the communication path 104 and not limited to be an end point or terminal unit to the communication path 104. The second communication unit 226 can include active and passive components, such as microelectronics or an antenna, for interaction with the communication path 104.

The second communication unit 226 can include a second communication interface 230. The second communication interface 230 can be used for communication between the second communication unit 226 and other functional units in the second device 106. The second communication interface 230 can receive information from the other functional units or from external sources, or can transmit information to the other functional units or to external destinations. The external sources and the external destinations refer to sources and destinations external to the second device 106.

The second communication interface 230 can include different implementations depending on which functional units are being interfaced with the second communication unit 226. The second communication interface 230 can be implemented with technologies and techniques similar to the implementation of the second control interface 236.

The second communication unit 226 can couple with the communication path 104 to send information to the first device 102 in the second device transmission 224. The first device 102 can receive information in the first communication unit 202 from the second device transmission 224 of the communication path 104.

The second control unit 238 can operate the second user interface 228 to present information generated by the computing system 100. The second user interface 228, in one embodiment, allows a system user 304 (not shown) to interface with the second device 106. The second user interface 228 can include an input device and an output device. Examples of the input device of the second user interface 228 can include a keypad, a touchpad, soft-keys, a keyboard, a microphone, sensors for receiving remote signals, or any combination thereof to provide data and communication inputs. Examples of the output device can include a second display interface 234 and a second audio interface 232.

The second control unit 238 can operate the second user interface 228 to present information generated by the computing system 100. The second control unit 238 can also execute the second software 244 for the other functions of the computing system 100. The second control unit 238 can further execute the second software 244 for interaction with the communication path 104 via the second communication unit 226.

The second display interface 234 can be any graphical user interface such as a display, a projector, a video screen, or any combination thereof. The second audio interface 232 can include sensors, speakers, microphones, headphones, subwoofers, surround sound components, transducers, or any combination thereof.

The second display interface 234 and the second audio interface 232 allow a system user 304 (not shown) to interact with the computing system 100 in order search for content 310 (not shown). Content 310 (not shown) can be sent to the first device 102 from the second device 106, or to the second device 106 from the first device 102, in a content stream.

The second location unit 246 can generate location information, current heading, and current speed of the second device 106, as examples. The second location unit 246 can be implemented in many ways. For example, the second location unit 246 can function as at least a part of a global positioning system (GPS) and can include components, such as a GPS receiver; an inertial navigation system, a cellular-tower location system, a pressure location system, or any combination thereof.

The second location unit 246 can include a second location interface 252. The second location interface 252 can be used for communication between the second location unit 246 and other functional units in the second device 106. The second location interface 252 can also be used for communication that is external to the second device 106. The second location interface 252 can be implemented with technologies and techniques similar to the implementation of the second control interface 236.

Functionality of the computing system 100 can be provided by the first control unit 210, the second control unit 238, or a combination thereof. For illustrative purposes, the second device 106 is shown with the partition having the second user interface 228, the second storage unit 240, the second control unit 238, a second location unit 246, and the second communication unit 226, although it is understood that the second device 106 can have a different partition. For example, the second software 244 can be partitioned differently such that some or all of its function can be in the second control unit 238 and the second communication unit 226. Also, the second device 106 can include other functional units not shown in FIG. 2 for clarity.

The first device 102 can have a similar or different partition as the second device 106. The functional units in the first device 102 can work individually and independently of the other functional units. The first device 102 can work individually and independently from the second device 106 and the communication path 104. The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 3:
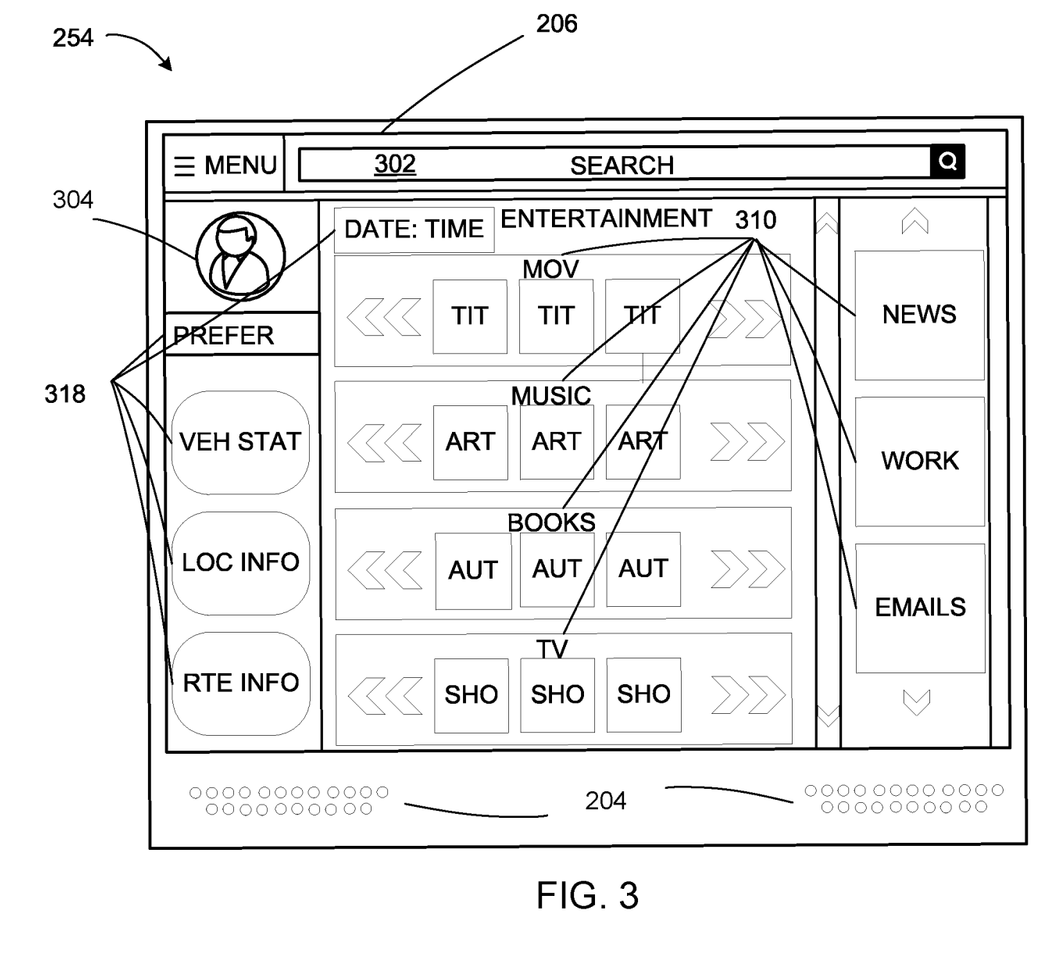
FIG. 3 is an example of a display interface of the computing system.

Referring now to FIG. 3, therein is shown an example of the first user interface 254 of the first device 102 or the second user interface 228 of the second device 106 of FIG. 1. For brevity of description in this embodiment, reference to the first user interface 254 will be made, however, the descriptions with respect to the first user interface 254 can be similarly applicable to the second user interface 228.

In one embodiment, the first user interface 254 includes the first display interface 206. The first display interface 206 can enable a content search using a search box 302. The content search includes any method of searching for content 310 on the first device 102, the second device 106, or a combination thereof. For example, the content search can be accomplished using any well-known search engine techniques, such as those used in a desktop search engine or a web search engine.

In one embodiment, alpha-numeric characters, symbols, or a combination thereof can be received in the search box 302 using the input device in order to search for content 310. Based on the received search request, the computing system 100 can search for content 310 on the second device 106 and return matching search results on the first display interface 206.

In another embodiment, the first display interface 206 can present content 310 suggested by the computing system 100 based on one or more environmental characteristics 318. An environmental characteristic 318 is a property of the first device 102, the second device 106, the setting in which the computing system 100 is being used, or any combination thereof. An environmental characteristic 318 can include, for example, information from a previous content search, a system user preference, a location information of the first device 102 or the second device 106, a route information of a vehicle in which the first device 102 or a second device 106 is integrated with, a date and time information, a vehicle status for a vehicle in which a first device 102 or a second device 106 is integrated with, or any combination thereof.

For example, in one embodiment the computing system 100 can monitor an environmental characteristic 318 such as a route information of a vehicle that the first device 102 or a second device 106 is integrated with using a monitoring module 440 (not shown). Based on the route information the computing system 100 can suggest content 310 that can be presented from beginning to end within the time interval it takes to travel the route. Content 310 suggested can be presented on the first display interface 206.

In another embodiment, the computing system 100 can monitor the location information of the first device 102 or the second device 106 using the monitoring module 440 (not shown) and suggest content 310 based on the specific location, such as content 310 that can be presented only within a certain geographic area. Content 310 suggested can be presented on the first display interface 206.

In another embodiment, the first audio interface 204, in conjunction with the first display interface 206, or by itself, can enable the content search using audio commands. Audio commands are instructions given to the computing system 100 using an audio input, such as voice, or other acoustic, mechanical, or electrical frequencies corresponding to audible sound waves. For example, audio commands can be received through a one or more sensors, microphones, transducers, or a combination thereof using the first audio interface 204. The audio commands can instruct the computing system 100 to search for content 310. The computing system 100 can present content 310 matching the search request on the first display interface 206, the first audio interface 204, or a combination thereof.

In another embodiment, the first audio interface 204 can enable the presentation of suggested content 310, in conjunction with a first display interface 206, or by itself, based on one or more environmental characteristics 318. For example, in one embodiment, the computing system 100 can monitor, using a monitoring module 440 (not shown), conversations in close proximity of the first device 102 or second device 106, and suggest content 310 based on the languages spoken. If the computing system 100 recognizes that conversations are taking place in a certain language, the computing system 100 can suggest content 310 specific to that language. For example, if the computing system 100 recognizes the Korean language is being spoken, the computing system 100 can suggest a K-Pop genre of music be played using the first audio interface 204 or a Korean language movie be presented on the first display interface 206.

Access to content 310 can be restricted or unrestricted. Unrestricted content 310 is content 310 that is public and can be accessed without limitation. Conversely, restricted content 310 is content 310 that cannot be accessed without limitation and is only available to certain system users 304 or certain devices that are granted access to content 310. For example, restricted content 310 includes content 310 that can only be accessed with a password, a code, a key, or content 310 that is limited to a specific system user 304, a specific group of system users 304, the first device 102, the second device 106, one or more peripheral devices, or a combination thereof. Restricted content 310 can also be restricted based on one or more environmental characteristics 318. Details of the access restrictions to content 310 will be discussed below.

Figure 4:
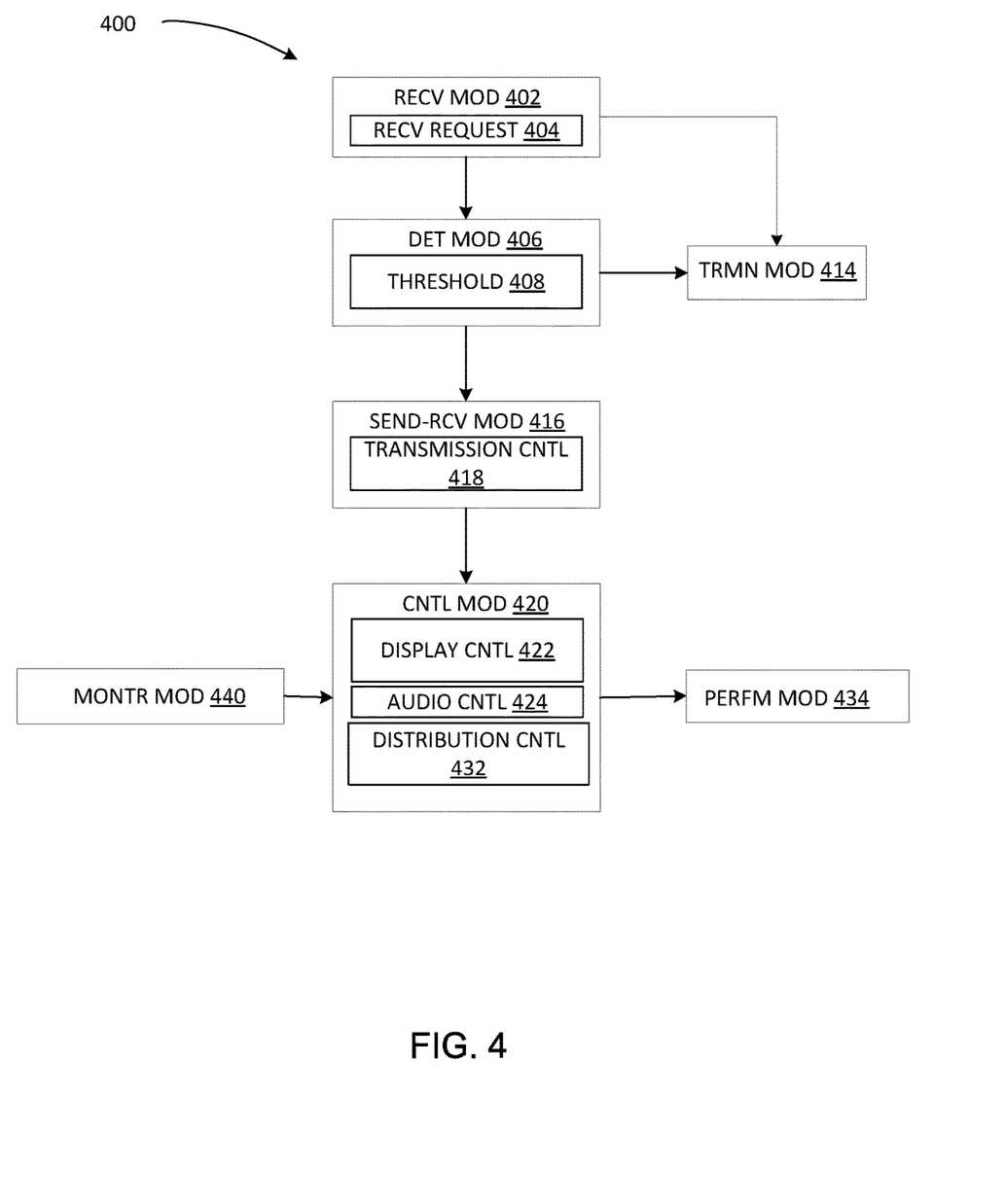
FIG. 4 is an exemplary control flow of the computing system.

Referring now to FIG. 4, therein is shown is an exemplary control flow of the computing system 100. The computing system 100 can include a receiver module 402, a determination module 406, a termination module 414, a send-receive module 416, a control module 420, a monitoring module 440, and a performance module 434.

In one embodiment, the receiver module 402 can be coupled to the determination module 406. The receiver module 402 can also be coupled to the termination module 414. The determination module 406 can be coupled to the send-receive module 416. The determination module 406 can also be coupled to the termination module 414. The send-receive module 416 can be coupled to the control module 420. The control module 420 can be coupled to the performance module 434. The control module 420 can also be coupled to the monitoring module 440. For brevity of description in this embodiment, reference to the first user interface 254 will be made, however, the descriptions with respect to the first user interface 254 can be similarly applicable to the second user interface 228.

In one embodiment, the receiver module 402 can receive a request 404 to send or to receive content 310. For example, the receiver module 402 can receive a request 404 for content 310 through the content search described in FIG. 3. The receiver module 402 can search for content 310 on the first device 102, the second device 106, or a combination thereof. The first user interface 254 can be populated with content 310 matching the request 404, as described in FIG. 3. Content 310 can be chosen from the populated content 310 to be received at the first device 102 or sent to the second device 106. If the computing system 100 cannot find matching content 310, the receiver module 402 can generate a prompt indicating that content 310 is not available and pass control to the termination module 414 which will terminate control flow of the computing system 100.

The termination module 414 terminates the control flow of the computing system 100 by ending the processes of the computing system 100. The termination module 414 restarts the process by which the computing system 100 receives a request 404 to send or to receive content 310.

Continuing with the example, and assuming that matching content 310 is found, in one embodiment, the receiver module 402 can pass control to the determination module 406. The determination module 406 determines whether to allow the sending or the receiving of content 310 based on a threshold 408. The threshold 408 is a condition or set of conditions which the computing system 100 or one or more of the components of the computing system 100 are compared against to determine whether content 310 should be sent or received. If the threshold 408 condition is met the determination module 406 can determine that content 310 should be sent or received to or from the first device 102, the second device 106, or a combination thereof in a content stream. If the threshold 408 condition is not met, the determination module 406 can determine that content 310 should not be sent or received and the determination module 406 can pass control to the termination module 414 which can terminate the control flow of the computing system 100.

Examples of the threshold 408 can include a determination whether the communication path 104 is able to send or receive content 310 in a content stream, a determination whether the computing system 100 meets minimum hardware or software requirements such that content 310 can be presented on the first user interface 254 or second user interface 228, a determination whether the system user 304 has proper authentication credentials to access content 310, a determination whether a payment condition has been met prior to being able to send or receive content 310, or any combination thereof. Determination of whether a threshold 408 has been met is made by analyzing a metric. The metric is a quantifiable parameter used to track, monitor, or assess the condition or set of conditions.

For example, in one embodiment, if the threshold 408 consists of determining whether the communication path 104 is able to send or to receive content 310, the determination module 406 can make this determination by analyzing one or more performance metrics indicating reliability of the communication path 104. Performance metrics are measures of performance of the communication path 104. Examples of performance metrics can include bandwidth availability along the communication path 104, communication channel 248 availability, signal throughput rate on the communication path 104, communication path 104 latency, bit error rate along the communication path 104, signal to noise ratio along the communication path 104, or a combination thereof. If, for example, the performance metric fails to meet a predetermined baseline for communication path 104 performance, the determination module 406 can determine that content 310 should not be sent or received.

For example, if the bandwidth available along the communication path 104 is below a predetermined baseline able to support the sending or receiving of content 310, or the bit error rate for signals being sent and received along the communication path 104 is above a predetermined baseline able to support the sending or receiving of content 310, or there are no available communication channels 248 on which to send content 310, then the threshold 408 condition will not met and the determination module 406 can determine that content 310 should not be sent or received.

In another embodiment, if the threshold 408 consists of determining whether the computing system 100 meets hardware or software requirements such that content 310 can be presented on the first user interface 254 or second user interface 228, the determination module 406 can make this determination by analyzing one or more property metrics of the computing system's 100 components. Components include the various hardware and software modules that make up the whole of the computing system 100. Property metrics are features describing one or more components. Examples of property metrics can include a component's model number, manufacturer, version, software compatibility, software version, or any combination thereof.

For example, if content 310 requires one or more components to support a high definition video or audio format, and one or more property metrics indicate that one or more components are incompatible with these formats because, for example, the software version of that component is too old, the determination module 406 can determine that content 310 should not be sent or received.

In another embodiment, if the threshold 408 consists of determining whether the system user 304 has proper authentication credentials to view content 310, the determination module 406 can make this determination by analyzing one or more authentication metrics associated with the system user 304. Authentication metrics are parameters used to identify one or more system users 304. Authentication metrics can include a password, a code, a key, a biometric authentication, or any combination thereof. For example, if content 310 is to be restricted to a specific system user 304, and a password is used to authenticate that system user 304, the determination module 406 can determine that content 310 should not be sent or received if the password received by the determination module 406 does not match a password associated with the system user 304.

In another embodiment, if the threshold 408 consists of determining whether a payment condition has been met prior to being able to send or receive content 310, the determination module 406 can make this determination by analyzing one or more input metrics associated content 310 to determine if the payment has been made. Payment refers to the exchange of a form of currency as a condition of accessing content 310. Payment can include, for example, any acceptable exchange of currency including money, credit, cryptocurrency, points, or any combination thereof. The input metric is a variable used to facilitate the payment. The input metric can include a credit card number, an account number, an electronic funds transfer account number, a rewards points account number, or any combination thereof.

For example, if payment is required for access to content 310, the determination module 406 can determine whether a payment has been made by receiving an input metric and using any payment platform such as a credit card payment platform, a mobile payment service, a payment system, or any combination thereof to validate the input metric. The input metric is validated if it can be verified to be associated with a valid account with sufficient funds to meet the payment requirement. If the input metric is validated, the determination module 406 can determine that content 310 should be sent or received. Conversely, if the input metric cannot be validated, the determination module 406 can determine that content 310 should not be sent or received.

Continuing with the example, if the determination module 406 determines that content 310 can be sent or received, the determination module 406 can, in one embodiment, pass control to the send-receive module 416. The send-receive module 416 controls the sending and the receiving of content 310 through the content stream. The send-receive module 416 controls the sending or receiving of content 310 using a transmission control 418. The transmission control 418 initiates the sending or receiving of content 310 over the communication path 104. The transmission control 418 can couple to the first communication interface 208, the second communication interface 230, or a combination thereof to enable the sending or receiving of content 310 using first device transmission 222 or second device transmission 224 over the communication path 104.

Continuing with the example, in one embodiment, the control module 420 can receive the content stream from the send-receive module 416. The control module 420 provides control over the presentation of content 310. For example, the control module 420 can determine the manner in which content 310 is presented using a display control 422, an audio control 424, a distribution control 432, or a combination thereof. The control module 420 can also control the presentation of content 310 based on one or more environmental characteristics 318 by coupling to a monitoring module 440.

The display control 422 controls a video component of content 310. The video component refers to a property related to the visual images associated with content 310. The video component can include a color, a picture size, a hue, a brightness, a picture definition, a picture quality, a video format, a refresh rate, a speed, or any combination thereof. The display control 422 can adjust one or more video components using any well-known methods. The display control 422 functionality can be implemented using software, hardware, or any combination thereof.

The audio control 424 controls an audio component of content 310. The audio component refers to a property related to the acoustic, mechanical, or electrical frequencies corresponding to audible sound waves associated with content 310. The audio component can include a volume, a treble, a bass, a pitch, a sound effect, an audio definition, an audio format, or a combination thereof, of content 310. The audio control 424 can adjust one or more of the audio components using any well-known method. The audio control 424 functionality can be implemented using software, hardware, or a combination thereof.

The control module 420 can also control the manner in which content 310 is distributed or re-distributed to or from the first device 102 or a second device 106, through a distribution control 432. Distribution and re-distribution refer to the manner in which content 310 is shared amongst the first device 102, the second device 106, a peripheral device, or a combination thereof. The distribution control 432 can employ a mechanism to control the distribution or re-distribution of content 310 including using encryption, an approved device list, a device identification, an activation code, a password, or any combination thereof. For example, the distribution control 432 can limit the number of peripheral devices that are connected to a first device 102 or a second device 106, from accessing content 310 by comparing peripheral devices to an approved device list. If, for example, a peripheral device is not on the approved device list, the distribution control 432 can determine that the peripheral device should not access content 310. The distribution control 432 functionality can be implemented using software, hardware, or a combination thereof.

In one embodiment, the control module 420 can couple to the monitoring module 440 to control the presentation of content 310 based on one or more environmental characteristics 318. The control module 420 can control the presentation of content 310 using the display control 422, audio control 424, the distribution control 432, or a combination thereof.

The monitoring module 440 can monitor one or more environmental characteristics 318 using one or more components of the computing system 100, for example sensors, microphones, transducers, the first location unit 214, the second location unit 246, or any combination thereof. The monitoring module 420 can collect information on the environmental characteristics 318. The monitoring module 440 can store information it collects in the first storage unit 216, the second storage unit 240, or a combination thereof. The control module 420 can access the information stored to control the presentation of content 310.

For example, in one embodiment, the monitoring module 440 can monitor the lighting conditions in which the first device 102 or the second device 106 is being used, using one or more sensors. The monitoring module 440 can store the information in the first storage unit 216, the second storage unit 240, or a combination thereof. The control module 420 can access the information and can determine what video components should be adjusted using the display control 422 based on the lighting conditions. For example, in dark lighting conditions, the control module 420 can determine to increase the brightness.

In another embodiment, the monitoring module 440 can monitor the sound conditions in which the first device 102 or the second device 106 is being used, by collecting information about the sound conditions through one or more sensors, microphones, transducers, or a combination thereof. The monitoring module 440 can store the information in the first storage unit 216, the second storage unit 240, or a combination thereof. The control module 420 can access the information and determine which audio component should be adjusted using the audio control 424 based on the information. For example, in high noise sound conditions, for example, in a construction zone, the control module 420 can determine to increase the volume.

In another embodiment, the monitoring module 440 can monitor a location of the first device 102 or the second device 106 using the first location unit 214, the second location unit 246, or a combination thereof and store the information in the first storage unit 216, second storage unit 240, or a combination thereof. The control module 420 can access the information, and based on the information, the control module 420 can determine whether to present content 310. For example, if content 310 is restricted in a certain geographic location, the control module 420 can prohibit the presentation of content 310 on the first display 102 or the second display 106, using the distribution control 432, if the first device 102 or the second device 106 enters the geographic location in which content 310 is restricted.

The performance module 434 enables the presentation of content 310. In one embodiment, the performance module 434 can couple to the control module 420 and the first user interface 254, the second user interface 228, or a combination thereof to present content 310. The performance module 434 can use well-known software or hardware components such as graphics cards, graphics processors, video cards, display drivers, audio cards, sound cards, or a combination thereof to enable presentation of content 310.

The computing system 100 has been described with module functions or order as an example. The computing system 100 can partition the modules differently or order the modules differently. For example, the first software 220 of FIG. 2 of the first device 102 can include the modules for the computing system 100. As a specific example, the first software 220 can include the receiver module 402, the determination module 406, the send-receive module 416, the control module 420, the monitoring module 440, the performance module 420, and associated sub-modules included therein.

The first control unit 210 of FIG. 2 can execute the first software 220 to operate the modules. For example, the first control unit 210 can implement the receiver module 402, the determination module 406, the send-receive module 416, the control module 420, the monitoring module 440, the performance module 420, or a combination thereof.

In another example of module partitions, the second software 244 of FIG. 2 of the second device 106 can include the modules for the computing system 100. As a specific example, the second software 244 can include the receiver module 402, the determination module 406, the send-receive module 416, the control module 420, the monitoring module 440, the performance module 420, and associated sub-modules included therein.

The second control unit 238 of FIG. 2 can execute the second software 244 to operate the modules. For example, the second control unit 238 can implement the receiver module 402, the determination module 406, the send-receive module 416, the control module 420, the monitoring module 440, the performance module 420, or a combination thereof.

The computing system 100 has been described with module functions or order as an example. The computing system 100 can partition the modules differently or order the modules differently. For example, the monitoring module 440 can be coupled to the determination module 406 to provide information on whether to allow the sending or the receiving of content 310 based on a threshold 408, an environmental characteristic 318, or a combination thereof.

The modules described in this application can be implemented as instructions stored on a non-transitory computer readable medium to be executed by a first control unit 210, the second control unit 238, or a combination thereof. The non-transitory computer medium can include the first storage unit 216, the second storage unit 240, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 5:
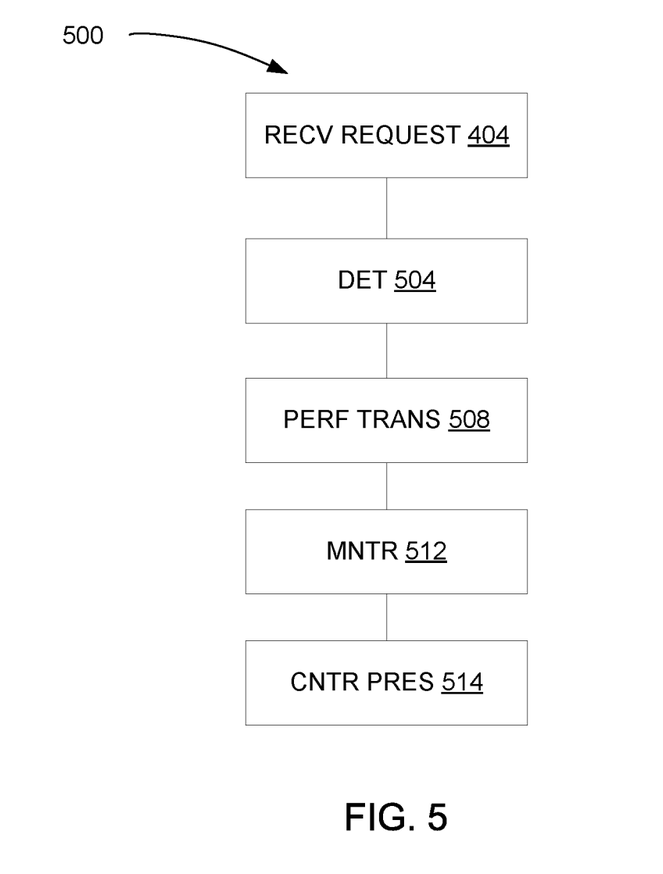
FIG. 5 is a flow chart of a method of operation of a computing system in a further embodiment of the present invention.

Referring now to FIG. 5, therein is shown a flow chart of a method of operation of a computing system in a further embodiment of the present invention. The method 500 includes: receiving a request 404 to send or to receive content 310; determining 504 whether to send or to receive content 310 based on a threshold 408; performing a transmission 508 of content 310 based on the threshold 408 for presenting content 310; monitoring 512 an environmental characteristic 318; and controlling a presentation 514 of content 310 based on the environmental characteristic 318.

The resulting method, process, apparatus, device, product, and system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level. While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    a first control unit in a vehicle or a second control unit, including a processor, configured to:
        receive a request to send or to receive a content, including a movie file, a music file, an image, an electronic book, a news feed, an email, or any combination thereof;
        determine whether to send or to receive the content based on a threshold, the threshold including analysis of a performance metric, representing a reliability of a communication path, and a property metric, representing hardware and software presentation capabilities, terminating the request, without the content sent or received, if the threshold is not met;
        monitor an environmental characteristic, the environmental characteristic including a route information;
        suggest the content based on the environmental characteristic; and
        control an adjustment for presentation of the content based on the environmental characteristic;
        control a distribution control for a distribution or a re-distribution of the content based an approved device list, a device identification, an activation code, a password, or any combination thereof;
    a first communication unit or a second communication unit, including microelectronics, coupled to the first control unit or the second control unit, configured to send or to receive a first device transmission or a second device transmission of the content based on the threshold; and
    a first user interface or a second user interface, coupled to the first control unit or the second control unit, configured to present the content includes an audio interface configured to monitor a conversation, proximate the user interface, to identify a language of the conversation and suggest the content in the language identified by the audio interface:
        includes presenting the content on the first user interface or the second user interface based on the threshold being met.

2. The computing system as claimed in claim 1 wherein the first user interface or the second user interface is further configured to present an audio component or a video component of the content, or a combination thereof.

3. The computing system as claimed in claim 1 wherein the first control unit or the second control unit is further configured to control the presentation of the content based on a location information.

4. The computing system as claimed in claim 1 wherein the first control unit or the second control unit is further configured to suggest the content based on a language spoken.

5. The computing system as claimed in claim 1 wherein the first communication unit or the second communication unit is further configured to:
    send or to receive the first device transmission or the second device transmission of a visual component of the content over a first communication channel; and
    send or to receive the first device transmission or the second device transmission of an audio component of the content over a second communication channel.

6. The computing system as claimed in claim 1 wherein:
    the first control unit or the second control unit is further configured to send or to receive a metric in relation to content; and
    the first communication unit or the second communication unit is further configured to send or to receive the first device transmission or the second device transmission of the metric from a first device or a second device.

7. The computing system as claimed in claim 1 wherein the first communication unit or the second communication unit is further configured to interface in a self-driving vehicle.

8. A method of operating a computing system comprising:
    receiving a request to send or to receive a content, including a movie file, a music file, an image, an electronic book, a news feed, an email, or any combination thereof;
    determining whether to send or to receive the content based on a threshold, the threshold including analyzing a performance metric, representing a reliability of a communication path, and a property metric, representing hardware and software presentation capabilities, terminating the request, without the content sent or received, if the threshold is not met;
    monitoring an environmental characteristic, the environmental characteristic including a route information;
    suggesting the content based on the environmental characteristic;
    controlling an adjustment for presenting the content based on the environmental characteristic;
    distributing or re-distributing the content based on an approved device list, a device identification, an activation code, a password, or any combination thereof;
    sending or to receiving a first device transmission or a second device transmission of the content based on the threshold; and
    controlling a presentation of the content based on the environmental characteristic, including a time interval to traverse a route based on the routing information; and
    presenting the content including monitoring a conversation, proximate a user interface, to identify a language of the conversation and suggest the content in the language identified by the audio interface for presenting the content on a first user interface or a second user interface based on the threshold being met.

9. The method of operating the computing system as claimed in claim 8, wherein presenting the content can include presenting an audio component or a visual component of the content, or a combination thereof.

10. The method of operating the computing system as claimed in claim 8, wherein controlling the presentation of the content is based on a location information.

11. The method of operating the computing system as claimed in claim 8, further comprising suggesting the content based on a language spoken.

12. The method of operating the computing system as claimed in claim 8, wherein:
sending or receiving the first device transmission or the second device transmission of a visual component of the content is over a first communication channel; and
sending or receiving the first device transmission or the second device transmission of an audio component of the content is over a second communication channel.

13. The method of operating the computing system as claimed in claim 8, further comprising:
sending or receiving a metric in relation to the content; and
sending or receiving the first device transmission or the second device transmission of the metric from a first device or a second device.

14. A non-transitory computer readable medium including instructions for operating a computing system comprising:
receiving a request to send or to receive a content, including a movie file, a music file, an image, an electronic book, a news feed, an email, or any combination thereof;
determining whether to send or to receive the content based on a threshold, the threshold including analysis of a performance metric, representing a reliability of a communication path, and a property metric, representing hardware and software presentation capabilities, includes terminating the request, without the content sent or received, if the threshold is not met;
monitoring an environmental characteristic, the environmental characteristic including a route information;
suggesting the content based on the environmental characteristic;
controlling an adjustment for presenting the content based on the environmental characteristic;
distributing or re-distributing the content based on an approved device list, a device identification, an activation code, a password, or any combination thereof;
sending or to receiving a first device transmission or a second device transmission of the content based on the threshold;
controlling a presentation of the content based on the environmental characteristic, including a time interval to traverse a route based on the routing information; and
presenting the content including monitoring a conversation, proximate a user interface, to identify a language of the conversation and suggest the content in the language identified by the audio interface for presenting the content on a first user interface or a second user interface based on the threshold being met.

15. The non-transitory computer readable medium as claimed in claim 14, with instructions wherein presenting the content can include presenting an audio component or a visual component of the content, or a combination thereof.

16. The non-transitory computer readable medium as claimed in claim 14, with instructions wherein controlling the presentation of the content is based on a location information.

17. The non-transitory computer readable medium as claimed in claim 14, with instructions further comprising:
sending or receiving a metric in relation to the content; and
sending or receiving the first device transmission or the second device transmission of the metric from a first device or a second device.

* * * * *